Sept. 21, 1954  J. KOLBE  2,689,747
VEHICLE WITH VARIABLE LENGTH BANKING LINKS
Filed Feb. 9, 1951  2 Sheets-Sheet 1

INVENTOR.
Joachim Kolbe
BY
Andrus & Scealer
Attorneys

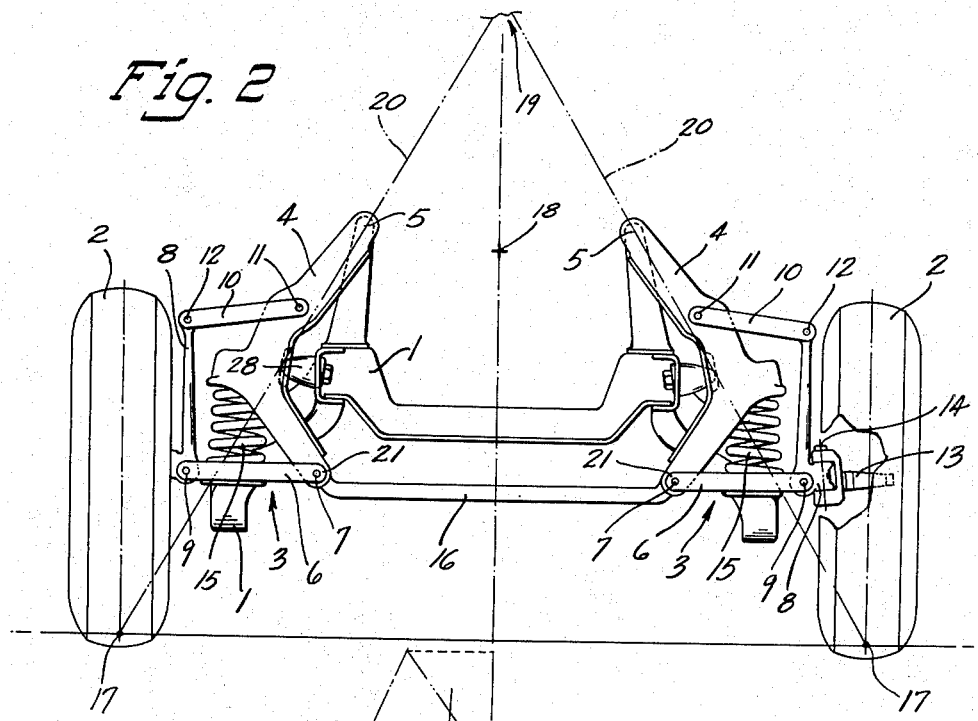
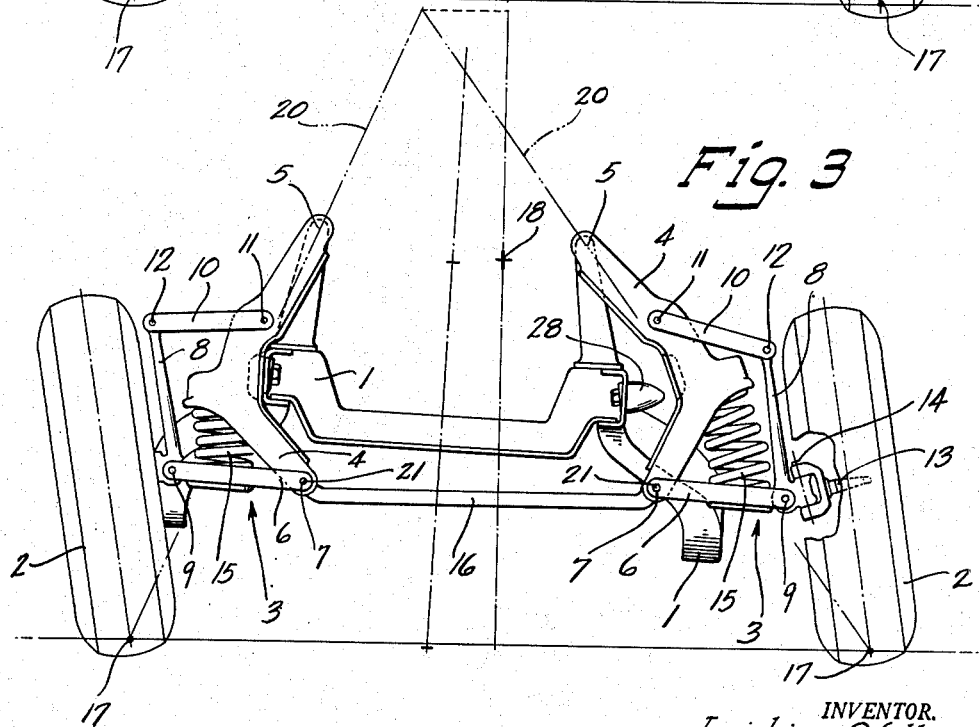

Patented Sept. 21, 1954

2,689,747

UNITED STATES PATENT OFFICE 2,689,747

VEHICLE WITH VARIABLE LENGTH BANKING LINKS

Joachim Kolbe, Sussex, Wis.

Application February 9, 1951, Serial No. 210,157

12 Claims. (Cl. 280—112)

This invention relates to a vehicle wherein the superstructure is supported by one or more pairs of independent wheel suspensions each comprising linkage of variable length operating in a transverse vertical plane and arranged to induce the superstructure to counter-bank under the influence of lateral forces.

The invention utilizes some of the principles of automatically inward or counterbanking vehicles, as described in the copending application Ser. No. 724,062, filed January 24, 1947, now Patent No. 2,576,686, November 27, 1951.

The invention is illustrated in its application to independent wheel suspensions for both the front and the rear of a family passenger automobile.

One of the principal objects of the present invention is to provide a car of the independent wheel suspension type wherein the suspension linkage is attached to the superstructure by means of horizontally extending banking hinges in an effort to greatly simplify the geometry, the layout work and the building of a banking car.

Another object of the invention is to combine certain features of the link-type banking support for the superstructure, such as constant caster and wheel base during banking, with features of the banking arm type, such as inclusion of the wheels and of the oscillation structure into the guiding means for the banking of the superstructure.

Another object is to reduce the angular movement of the variable length banking links about their banking shafts for a given amount of banking of the superstructure, to thereby make possible the use of rubber bearings in the system.

Another object of the invention is to provide a banking car in which the banking structure is especially suited for attachment to a unit frame-body structure, or even to a frameless body structure.

Another object of the invention is to provide a vehicle of the inward banking type in which the variable length banking links can be placed ahead and behind the passenger compartment of the vehicle without interference with the seat and floor space of the compartment.

Another object of the invention is to make available the design of an inwardly banking mounting for at least one pair of independently suspended wheels, which can be used in combination with other means to secure banking of the vehicle, especially with those most suited for rigid rear axle structures.

Other objects and advantages of the invention are set forth hereinafter.

The principles of the present invention are illustrated in the accompanying drawings in which:

Figure 2 is a front elevation of the front banking structure shown in Figure 1 and Figure 3 is a view of the structure shown in Figure 2, but in a banked position.

Figure 1:
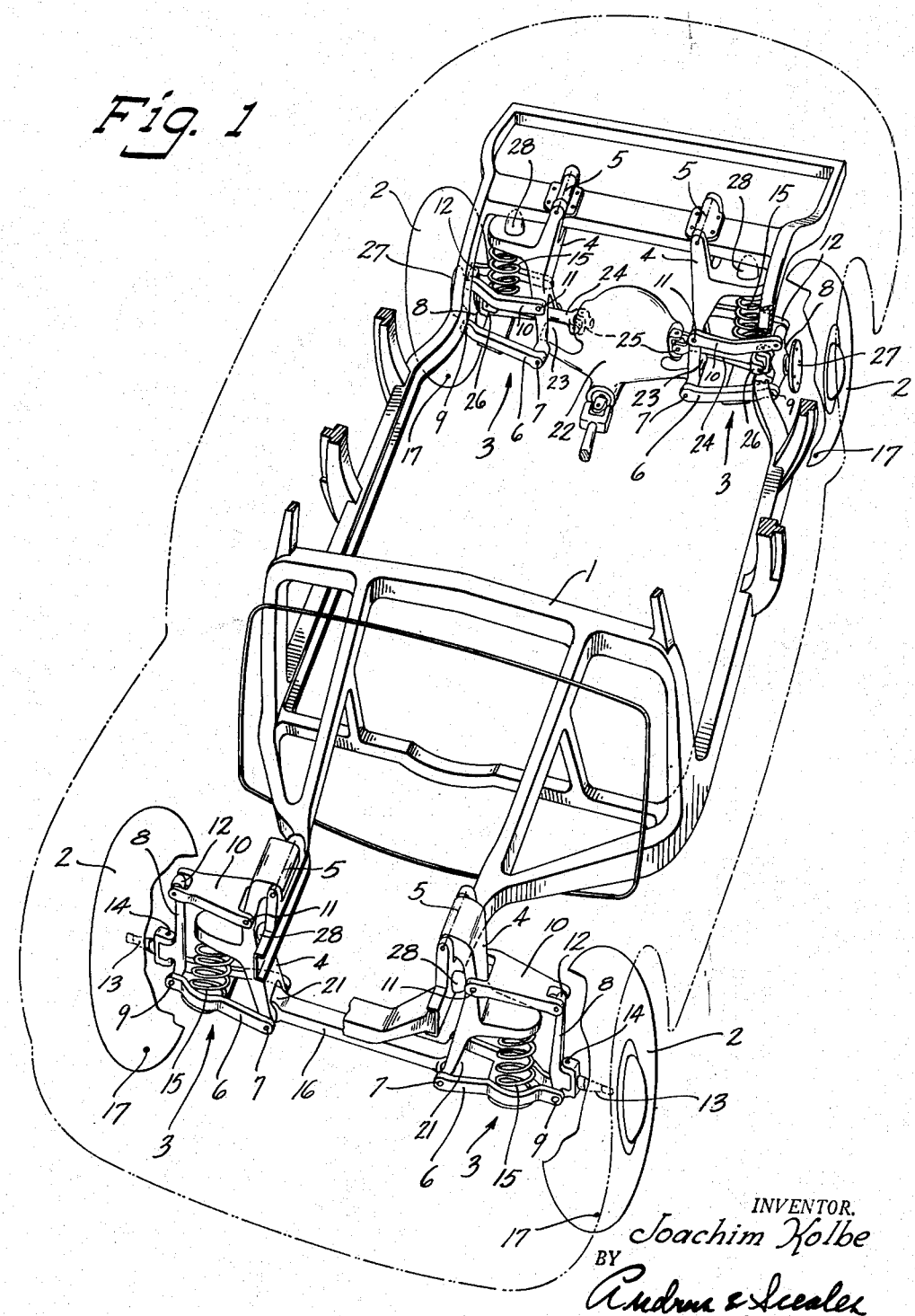
Figure 1 is a perspective view of a car of the unit frame-body type embodying the invention.

Various constructions may be employed utilizing the principles illustrated.

The vehicle illustrated in the figures comprises the superstructure 1, which may be made up of a chassis frame or the frame-body unit shown, including all parts normally supported thereby, such as the engine and steering gear, and the wheels 2, which support the superstructure on the road. There are two pairs of wheels, one at the front end of the superstructure and the other at the rear end of the superstructure, the wheels of each pair being disposed in axial alignment on opposite sides of the superstructure.

The wheels 2 are secured to the superstructure 1 by the wheel carriers 3, which provide for vertical oscillation of each wheel relative to the superstructure for the purpose of giving a soft ride to the latter on rough roads.

The wheel carriers 3 are arranged in pairs similar to the wheels. Each wheel carrier constitutes an independent wheel suspension and comprises a banking hinge support member 4 pivoted to the superstructure by a horizontally and longitudinally extending banking hinge 5. A lower suspension control arm 6 is pivoted at its inner end to the member 4 by hinge 7 and at its outer end to the corresponding spindle support member 8 by hinge 9. An upper suspension control arm 10 is pivotally connected to the banking hinge support member 4 by hinge 11 and to the spindle support member 8 by hinge 12.

The hinges 7, 9, 11 and 12 as shown extend parallel to each other and substantially longitudinally of the vehicle and horizontally. The hinges may however be arranged at an angle different from that of the horizontal banking hinge 5.

The spindle support member 8 of the front assembly carries a spindle or wheel bearing structure 13 pivotally guided by the king pin 14.

Each carrier 3 embodies a suitable cushion means 15 mounted to bridge the vertical oscillation quadrangle formed by the lower and upper control arms 6 and 10 respectively and the banking hinge support member 4.

In the front the spring 15 is mounted between the lower arm 6 and member 4 and in the rear the spring 15 is mounted between the upper arm 10 and member 4.

Each pair of carriers 3 is interconnected by a tie structure 16, which might take the form of one or more tie rods or might be represented by an independent wheel drive mechanism as described hereinafter.

In accordance with the principles set forth in copending application Serial No. 724,062 and as illustrated in Figure 2 a location of the banking hinge 5 relative to the tire to road contact point 17 and relative to the center of mass 18 of the superstructure has been selected which secures a center of motion 19 for the banking movement of the superstructure 1 relative to the road contact points 17.

This center of motion 19 is determined both for the front and for the rear of the car by the intersection of link lines 20 which are drawn normal to the axis for the corresponding banking hinge 5 from the related road contact point 17, and have a common transverse vertical plane containing the contact points 17, as shown in Figures 2 and 3.

The variable length links of the present invention are represented by the individual link lines 20, and each variable link includes all of the carrier mechanism between the given banking hinge 5 and the related road contact point 17. The length of each banking link is represented by the distance along line 20 between the banking hinge 5 and the road contact point 17, and since this distance changes during banking the length of the link changes.

The point of intersection 19 of the link lines 20 which indicates the motion center for the pair of the variable length banking links should at all times be located sufficiently high above the effective center of mass for the corresponding portion of the superstructure being supported by the pair of variable length banking links to secure an effective lever for lateral forces acting upon the center of mass 18 to achieve the banking turn about the motion center and the necessary stability for the vehicle both in straight ahead travel and during counterbanking.

Figure 3 illustrates the structure of Figure 2, but in a banked position and also shows how the center of motion moves laterally and somewhat downwardly together with the lateral movement of the center of mass 18 but remains at all times above the center of mass 18 for the corresponding part of the superstructure supported by the pair of the variable length banking links.

The tie structure 16 for the front pair of variable length banking links interconnects the banking hinge support members 4 by means of longitudinally and horizontally extending hinges 21. Where the tie rod structure 16 is arranged between the oscillation quadrangles of the pair of wheel carriers 3 so as to interconnect for instance the lower suspension control arms 6 ball joints have to be provided at the end of the tie rod structure 16 unless both oscillation hinges and banking hinges of both sides are parallel.

The tie rod structure in the rear of the vehicle as illustrated in Figure 1 comprises the differential housing 22, which is suspended by means of the horizontally and longitudinally extending hinges 23 between the banking hinge support members 4. The drive shafts 24 for the rear wheels 2 are connected at their inner ends by universal joints 25 to the differential gear mechanism and at their outer ends by universal joints 26 to the wheel spindles 27 which are carried by the wheel support members 8.

The lateral inward turn of each variable length banking link relative to the superstructure in response to lateral forces is controlled by the banking spring 28 which is mounted to bridge the banking hinge 5. The springs 28 are shown as resilient rubber cushion blocks mounted upon the superstructure 1 and disposed to be engaged by corresponding banking hinge members 4. The springs 28 for each pair of variable length banking links are opposed to each other and serve to keep the superstructure substantially centered and upright when travelling on a straight road.

The invention is applicable to different kinds of oscillation mechanisms for independently suspended wheels. It is also applicable to both steerable and nonsteerable wheels.

Various embodiments of the invention may be employed within the scope of the accompanying claims.

I claim:

1. A vehicle comprising a superstructure adapted to bank on turns, pairs of opposed variable length banking link mechanisms including independent wheel carriers spaced laterally apart on opposite sides of the longitudinal center line of the superstructure and longitudinally thereof, each variable length banking link mechanism extending from the superstructure to the effective road support therefor and being pivotally connected to the superstructure by a single horizontally and longitudinally extending banking hinge, and means interconnecting the variable length banking link mechanisms of each pair to retain the effective road supports of the pair in substantially constant spaced relation, the link line of each banking link mechanism of a pair of link mechanisms intersecting and normal to the corresponding horizontal banking hinge axis and containing the tire to road contact point meeting the link line of the other banking mechanism of the pair in a motion center point for the pair located substantially above the level of the effective center of mass for the portion of the superstructure supported by the pair.

2. A vehicle comprising a superstructure adapted to bank on turns, at least one pair of opposed variable length banking link mechanisms including independent wheel carriers spaced laterally apart on opposite sides of the longitudinal center line of the superstructure to support a corresponding part thereof, each variable length banking link mechanism extending from the superstructure to the effective road support therefor and being pivotally connected to the superstructure by a single horizontally and longitudinally extending banking hinge, means interconnecting the variable length banking link mechanisms of the pair to retain the effective road supports of the pair in substantially constant spaced relation, the link line of each banking link mechanism of the pair of link mechanisms intersecting and normal to the corresponding horizontal banking hinge axis and containing the tire to road contact point meeting the link line of the other banking link mechanism of the pair in a motion center point for the pair located substantially above the level of the effective center of mass for the portion of the superstructure supported by the pair, and a banking support for the remainder of said superstructure correlated to the movement of the superstructure upon said variable length banking link mechanisms to guide the superstructure in its rotational banking movement relative to a substantially horizontally extending motion center line passing through said motion center point to provide a common axis of rotation for the superstructure extending substantially above the center of gravity thereof whereby lateral forces acting upon the superstructure tend to turn the superstructure at that common axis into a banked position.

3. A vehicle comprising a superstructure adapted to bank on turns, pairs of opposed variable length banking link mechanisms including independent wheel carriers spaced laterally apart on opposite sides of the longitudinal center line of the superstructure and longitudinally thereof, each variable length banking link mechanism extending from the superstructure to the effective road support therefor and being pivotally connected to the superstructure by a single horizontally and longitudinally extending banking hinge, means interconnecting the variable length banking link mechanisms of each pair to retain the effective road supports of the pair in substantially constant spaced relation, and resilient means disposed to resist turning movement at the banking hinges of said variable length banking link mechanisms and thereby retain the superstructure upright on said links when free from lateral forces, the link line of each banking link mechanism of a pair of link mechanisms intersecting and normal to the corresponding horizontal banking hinge axis and containing the tire to road contact point meeting the link line of the other banking link mechanism of the pair in a motion center point for the pair located substantially above the level of the effective center of mass for the portion of the superstructure supported by the pair.

4. A vehicle comprising a superstructure adapted to bank on turns, pairs of opposed variable length banking link mechanisms including independent wheel carriers spaced laterally apart on opposite sides of the longitudinal center line of the superstructure and longitudinally thereof, each variable length banking link mechanism extending from the superstructure to the effective road support therefor and being pivotally connected to the superstructure by a single horizontally and longitudinally extending banking hinge, means interconnecting the variable length banking link mechanisms of each pair to retain the effective road supports of the pair in substantially constant spaced relation, and resilient means associated with each variable length banking link mechanism to provide for relative vertical oscillation between the superstructure and the point of effective road support for the corresponding variable length banking link mechanism, the link line of each banking link mechanism of a pair of link mechanisms intersecting and normal to the corresponding horizontal banking hinge axis and containing the tire to road contact point meeting the link line of the other banking link mechanism of the pair in a motion center point for the pair located substantially above the level of the effective center of mass for the portion of the superstructure supported by the pair.

5. A vehicle comprising a superstructure adapted to bank on turns, pairs of opposed variable length banking link mechanisms including independent wheel carriers spaced laterally apart on opposite sides of the longitudinal center line of the superstructure and longitudinally thereof, each variable length banking link mechanism extending from the superstructure to the effective road support therefor and being pivotally connected to the superstructure by a single horizontally and longitudinally extending banking hinge, means interconnecting the variable length banking link mechanisms of each pair to retain the effective road supports of the pair in substantially constant spaced relation, and resilient means disposed to provide for vertical oscillation of the outer end of each variable length banking link mechanism substantially independently of pivotal movement at the banking hinge axis, the link line of each banking link mechanism of a pair of link mechanisms intersecting and normal to the corresponding horizontal banking hinge axis and containing the tire to road contact point meeting the link line of the other banking link mechanism of the pair in a motion center point for the pair located substantially above the level of the effective center of mass for the portion of the superstructure supported by the pair.

6. A vehicle comprising a superstructure adapted to bank on turns, pairs of opposed variable length banking link mechanisms including independent wheel carriers spaced laterally apart on opposite sides of the longitudinal center line of the superstructure and longitudinally thereof, each variable length banking link mechanism extending from the superstructure to the effective road support therefor and being pivotally connected to the superstructure by a single horizontally and longitudinally extending banking hinge, means interconnecting the variable length banking link mechanisms of each pair to retain the effective road supports of the pair in substantially constant spaced relation, resilient means disposed to resist turning movement at the banking hinges of said variable length banking link mechanisms and thereby retain the superstructure upright on said link mechanisms when free from lateral forces, and resilient means associated with each variable length banking link mechanism to provide for relative vertical oscillation between the superstructure and the point of effective road support for the corresponding variable length banking link mechanism, the link line of each banking link mechanism of a pair of link mechanisms intersecting and normal to the corresponding horizontal banking hinge axis and containing the tire to road contact point meeting the link line of the other banking link mechanism of the pair in a motion center point for the pair located substantially above the level of the effective center of mass for the portion of the superstructure supported by the pair.

7. A vehicle comprising a superstructure adapted to bank on turns, at least one pair of opposed variable length banking link mechanisms including independent wheel carriers spaced laterally apart on opposite sides of the longitudinal center line of the superstructure to support a corresponding part thereof, each variable length banking link mechanism extending from the superstructure to the effective road support therefor and being pivotally connected to the superstructure by a single horizontally and longitudinally extending banking hinge, means interconnecting the variable length banking link mechanisms of the pair to retain the effective road supports of the pair in substantially constant spaced relation, resilient means disposed to resist turning movement at the banking hinges of said variable length banking link mechanisms and thereby retain the superstructure upright on said links when free from lateral forces, the link line of each banking link mechanism of the pair of link mechanisms intersecting and normal to the corresponding horizontal banking hinge axis and containing the tire to road contact point meeting the link line of the other banking link mechanism of the pair in a motion center point for the pair located substantially above the level of the effective center of mass for the portion of the superstructure supported by the pair, and a banking support for the remainder of said superstructure correlated to the movement of the superstructure upon said variable length banking link mechanisms to guide the superstructure in its rotational banking movement relative to a substantially horizontally extending motion center line passing through said motion center point to provide a common axis of rotation for the superstructure extending substantially above the center of gravity thereof whereby lateral forces acting upon the superstructure tend to turn the superstructure at that common axis into a banked position.

8. A vehicle comprising a superstructure adapted to bank on turns, at least one pair of opposed variable length banking link mechanisms including independent wheel carriers spaced laterally apart on opposite sides of the longitudinal center line of the superstructure to support a corresponding part thereof, each variable length banking link mechanism extending from the superstructure to the effective road support therefor and being pivotally connected to the superstructure by a single horizontally and longitudinally extending banking hinge, means interconnecting the variable length banking link mechanisms of the pair to retain the effective road supports of the pair in substantially constant spaced relation, resilient means disposed to resist turning movement at the banking hinges of said variable length banking link mechanisms and thereby retain the superstructure upright on said links when free from lateral forces, resilient means associated with each variable length banking link mechanism to provide for relative vertical oscillation between the superstructure and the point of effective road support for the corresponding variable length banking link mechanism, the link line of each banking link mechanism of the pair of link mechanisms intersecting and normal to the corresponding horizontal banking hinge axis and containing the tire to road contact point meeting the link line of the other banking link mechanism of the pair in a motion center point for the pair located substantially above the level of the effective center of mass for the portion of the superstructure supported by the pair, and a banking support for the remainder of said superstructure correlated to the movement of the superstructure upon said variable length banking link mechanisms to guide the superstructure in its rotational banking movement relative to a substantially horizontally extending motion center line passing through said motion center point to provide a common axis of rotation for the superstructure extending substantially above the center of gravity thereof whereby lateral forces acting upon the superstructure tend to turn the superstructure at that common axis into a counterbanked position.

9. A vehicle comprising a superstructure adapted to bank on turns, pairs of opposed variable length banking link mechanisms including independent wheel carriers spaced laterally apart on opposite sides of the longitudinal center line of the superstructure and longitudinally thereof, each variable length banking link mechanism extending from the superstructure to the effective road support therefor and being pivotally connected to the superstructure by a horizontally and longitudinally extending banking hinge, each of said variable length banking link mechanisms being articulated to provide for vertical oscillation of one end relative to the other upon an effective oscillation pivotal axis which is substantially horizontal and near to the connection between the corresponding variable length banking link mechanism and the superstructure, resilient means disposed to bridge said oscillation axis and thereby control the articulation of each corresponding variable length banking link mechanism, and means interconnecting the variable length banking link mechanisms of each pair to retain the effective road supports of the pair in substantially constant spaced relation, the link line of each banking link mechanism of a pair of link mechanisms intersecting and normal to the corresponding horizontal banking hinge axis and containing the tire to road contact point meeting the link line of the other banking link mechanism of the pair in a motion center point for the pair located substantially above the level of the effective center of mass for the portion of the superstructure supported by the pair.

10. A vehicle comprising a superstructure adapted to bank on turns, pairs of opposed variable length banking link mechanisms including independent wheel carriers spaced laterally apart on opposite sides of the longitudinal center line of the superstructure and longitudinally thereof, each variable length banking link mechanism extending from the superstructure to the effective road support therefor and being pivotally connected to the superstructure by a horizontally and longitudinally extending banking hinge, each of said variable length banking link mechanisms being articulated to embody a hinge support at the end carrying the banking hinge and an oscillation arm connected to said support to oscillate vertically relative thereto upon an effective pivotal axis therebetween which is substantially horizontal, resilient means disposed between said hinge support and oscillating arm to control the vertical oscillation of the outer end of the arm relative to the superstructure, and means interconnecting the variable length banking link mechanisms of each pair to retain the effective road supports of the pair in substantially constant spaced relation, the link line of each banking link mechanism of a pair of link mechanisms intersecting and normal to the corresponding horizontal banking hinge axis and containing the tire to road contact point meeting the link line of the other banking link mechanism of the pair in a motion center point for the pair located substantially above the level of the effective center of mass for the portion of the superstructure supported by the pair.

11. A vehicle comprising a superstructure adapted to bank on turns, at least one pair of opposed variable length banking link mechanisms including independent wheel carriers spaced laterally apart on opposite sides of the longitudinal center line of the superstructure to support a corresponding part thereof, each variable length banking link mechanism extending from the superstructure to the effective road support therefor and being pivotally connected to the superstructure by a horizontally and longitudinally extending banking hinge, each of said variable length banking link mechanisms being articulated to embody a hinge support at the end carrying the banking hinge and an oscillation arm connected to said support to oscillate vertically relative thereto upon an effective pivotal axis therebetween which is substantially horizontal, resilient means disposed between said hinge support and oscillating arm to control the vertical oscillation of the outer end of the arm relative to the superstructure, means interconnecting the variable length banking link mechanisms of the pair to retain the effective road supports of the pair in substantially constant spaced relation, the link line of each banking link mechanism of the pair of link mechanisms intersecting and normal to the corresponding horizontal banking hinge axis and containing the tire to road contact point meeting the link line of the other banking link mechanism of the pair in a motion center point for the pair located substantially above the level of the effective center of mass for the portion of the superstructure supported by the pair, and a banking support for the remainder of said superstructure correlated to the movement of the superstructure upon said variable length banking link mechanisms to guide the superstructure in its rotational banking movement relative to a substantially horizontally extending motion center line passing through said motion center point to provide a common axis of rotation for the superstructure extending substantially above the center of gravity thereof whereby lateral forces acting upon the superstructure tend to turn the superstructure at that common axis into a banked position.

12. A vehicle comprising a superstructure adapted to bank on turns, pairs of opposed variable length banking link mechanisms including independent wheel carriers spaced laterally apart on opposite sides of the longitudinal center line of the superstructure and longitudinally thereof, each variable length banking link mechanism extending from the superstructure to the effective road support therefor and being pivotally connected to the superstructure by a single horizontally and longitudinally extending banking hinge, and means interconnecting the variable length banking link mechanisms of each pair to retain the effective road supports of the pair in substantially constant spaced relation, the link line of each banking link mechanism of a pair of link mechanisms intersecting and normal to the corresponding horizontal banking hinge axis and containing the tire to road contact point meeting the link line of the other banking link mechanism of the pair in a motion center point for the pair located substantially above the level of the effective center of mass for the portion of the superstructure supported by the pair, said pairs of variable length banking link mechanisms being correlated with each other to provide a common axis of rotation for the superstructure during banking and which axis is substantially parallel to the longitudinal center line of the superstructure and substantially above the center of gravity at all times.

References Cited in the file of this patent

UNITED STATES PATENTS

| Number | Name | Date |
|---|---|---|
| 2,152,938 | Welch | Apr. 4, 1939 |
| 2,186,065 | Fischer | Jan. 9, 1940 |
| 2,242,584 | Kolbe | May 20, 1941 |
| 2,341,726 | Kolbe | Feb. 15, 1944 |